(12) United States Patent
Donoho

(10) Patent No.: US 10,191,629 B2
(45) Date of Patent: Jan. 29, 2019

(54) SYSTEMS AND METHODS FOR PROCESSING OF VISUAL CONTENT USING AFFORDANCES

(71) Applicant: Andrew W Donoho, Austin, TX (US)

(72) Inventor: Andrew W Donoho, Austin, TX (US)

( * ) Notice: Subject to any disclaimer, the term of this patent is extended or adjusted under 35 U.S.C. 154(b) by 450 days.

(21) Appl. No.: 14/809,185

(22) Filed: Jul. 25, 2015

(65) Prior Publication Data

US 2016/0041740 A1 Feb. 11, 2016

Related U.S. Application Data

(60) Provisional application No. 61/999,403, filed on Jul. 25, 2014.

(51) Int. Cl.
*G06F 17/30* (2006.01)
*G06F 3/0484* (2013.01)
(Continued)

(52) U.S. Cl.
CPC ........ *G06F 3/04842* (2013.01); *G06F 3/0482* (2013.01); *G06F 3/0488* (2013.01); *G06F 3/04883* (2013.01)

(58) Field of Classification Search
CPC .............. G06F 3/0482; G06F 3/04842; G06F 3/04883; G06F 3/04817; G06F 3/04845; G06F 3/0481; G06F 3/017; G06F 3/0484; G06F 3/0488; G06F 3/04886; G06F 3/0416; G06F 3/167; G06F 3/0485; G06F 3/0486; G06F 3/165; G06F 17/24; G06F 17/2785; G06F 17/28; G06F 17/30241; G06F 17/30867; G06F 2203/04105; G06F 2203/04806; G06F 3/016; G06F 3/04847; G06F 3/1423; G06F 8/38; G06F 9/4443; G06F 17/212; G06F 17/241; G06F 17/273; G06F 17/276; G06F 17/30528; G06F 17/30554; G06F 17/30654; G06F 17/30976; G06F 2203/04808; G06F 3/0362; G06F 3/041; G06F 3/048; G06F 3/04812; G06F 13/102; G06F 17/218; G06F 17/2241; G06F 17/2247; G06F 17/242; G06F 17/248; G06F 17/2705; G06F 17/271; G06F 17/2735; G06F 17/274; G06F 17/2765;
(Continued)

(56) References Cited

U.S. PATENT DOCUMENTS 8,878,845 B2 * 11/2014 Brown .................... G06T 17/30
345/420
9,984,099 B2 * 5/2018 Kim ........................ G06F 17/50
(Continued)

*Primary Examiner* — Sheree N Brown
(74) *Attorney, Agent, or Firm* — Kevin Gust

(57) ABSTRACT

A system and method are disclosed for processing of visual content and data based on user inputs associated with affordances on a touch screen computer. Visual content may be obtained from one or more sources and presented to the user, either as still images or as a continual stream of images. As visual content is presented, the user can contact the touchscreen in any of a plurality of affordances. Depending on which affordance or affordances are contacted, the direction of motion across an affordance, or the like, the computer may perform a selected action to the instance of the visual content or invoke a change such that similar or related visual content is processed in a similar manner.

15 Claims, 3 Drawing Sheets

(51) Int. Cl.
*G06F 3/0488* (2013.01)
*G06F 3/0482* (2013.01)

(58) Field of Classification Search
CPC .......... G06F 17/2836; G06F 17/30011; G06F 17/30061; G06F 17/30386; G06F 17/30389; G06F 17/30401; G06F 17/30684; G06F 17/30707; G06F 17/3082; G06F 17/3084; G06F 17/30864; G06F 17/3087; G06F 17/30905; G06F 17/30958; G06F 17/30994; G06F 19/3481; G06F 1/163; G06F 1/1652; G06F 1/1694; G06F 1/181; G06F 1/20; G06F 1/28; G06F 1/3212; G06F 21/6245; G06F 2200/1637; G06F 2200/201; G06F 2203/0381; G06F 2203/04102; G06F 2203/04104; G06F 2203/04108; G06F 2203/04803; G06F 3/00; G06F 3/01; G06F 3/012; G06F 3/014; G06F 3/015; G06F 3/0304; G06F 3/0308; G06F 3/033; G06F 3/0346; G06F 3/03547; G06F 3/0412; G06F 3/044; G06F 3/0483; G06F 3/04855; G06F 3/04895; G06F 9/4446
USPC ........................................................ 715/863
See application file for complete search history.

(56) References Cited

U.S. PATENT DOCUMENTS

| | | | | |
|---|---|---|---|---|
| 2011/0153414 | A1* | 6/2011 | Elvekrog | G06Q 30/02 705/14.43 |
| 2011/0153653 | A1* | 6/2011 | King | G06F 17/30253 707/769 |
| 2012/0086719 | A1* | 4/2012 | Brown | G06T 17/30 345/582 |
| 2012/0314899 | A1* | 12/2012 | Cohen | G06F 3/012 382/103 |
| 2014/0354845 | A1* | 12/2014 | Molgaard | H04N 1/215 348/222.1 |
| 2015/0324393 | A1* | 11/2015 | Kim | G06F 17/50 707/722 |

* cited by examiner

SYSTEMS AND METHODS FOR PROCESSING OF VISUAL CONTENT USING AFFORDANCES

RELATED APPLICATIONS

This application claims the benefit of U.S. Provisional Application No. 61/999,403, filed Jul. 25, 2014.

FIELD OF THE DISCLOSURE

The present disclosure relates generally to images, videos and other multimedia handling, and more specifically to processing of visual content and data based on user inputs associated with affordances on a touch screen computer.

BACKGROUND

Users of computing devices have increasing access to visual content from a multitude of sources. People regularly post images of places, events, people, and other subjects. An advantage to this volume of content is the ability for someone to find pictures, GIFs, and other visual content on just about anything they can imagine. A disadvantage to this volume may be the time needed to parse through each and every piece of visual content.

SUMMARY

In one broad respect, embodiments may be directed to a system for processing visual content using affordances. The system may comprise a processor operably coupled to a touch screen interface and a computer readable memory storing a set of instructions executable by the processor. The processing may include retrieving, from an online visual content sharing source, a plurality of instances of visual content based on one or more criteria; presenting, via a graphical user interface (GUI), an instance of visual content from the plurality of instances of visual content, to a user; detecting a user input in relation to an affordance of at least two affordances associated with the instance of visual content; and processing the instance of visual content based on the input and the affordance. In some respects, a criterion of the one or more criteria is user-defined. In some respects, a database is operably coupled to the processor, wherein processing the instance of visual content based on the input and the affordance comprises storing the instance of visual content in the database. In some respects, the set of computer instructions are further executable to perform: invoking a change in behavior of the system based on an analysis of the user input in relation to an affordance of the instance of visual content. In some respects, the change in behavior comprises, for each image subsequently retrieved by the system, determining how that image should be processed. In some respects, wherein determining how an instance of visual content should be processed comprises determining that the instance of visual content should not be presented to the user or stored. In some respects, wherein determining how an instance of visual content should be processed comprises determining that the instance of visual content should be stored in the memory. In some respects, wherein determining how an instance of visual content should be processed comprises determining where that instance of visual content should be stored in a database or file system. In some respects, a criterion of the one or more criteria is predetermined.

In another broad respect, embodiments disclosed herein may be directed to a system comprising a processor operably coupled to a touch screen interface and a computer readable memory storing a set of instructions. The set of instructions may be executable by the processor to perform retrieving, from an online visual content sharing source, a plurality of instances of visual content based on one or more criteria; presenting, via a graphical user interface (GUI), an instance of visual content from the plurality of instances of visual content, to a user; detecting a user input in relation to an affordance of at least two affordances associated with the instance of visual content; and invoking a change in behavior of the system based on an analysis of the user input in relation to an affordance of the instance of visual content. In some respects, the change in behavior comprises for each instance of visual content subsequently retrieved by the system, determining how that instance of visual content should be processed. In some respects, determining how an instance of visual content should be processed comprises determining that the instance of visual content should not be presented to the user or stored. In some respects, determining how an instance of visual content should be processed comprises determining that the instance of visual content should be stored in the memory. In some respects, determining how an instance of visual content should be processed comprises determining where that instance of visual content should be stored in a database or file system. In some respects, the change in behavior comprises determining one or more ads to be presented to the user. In some respects, a criterion of the one or more criteria is user-defined. In some respects, processing comprises parsing all data associated with the instance of visual content and storing the parsed data in a database. In some respects, processing comprises comparing the parsed data with data stored in a database to identify which criterion should serve as a basis for invoking the change in behavior.

BRIEF DESCRIPTION OF THE DRAWINGS

A clear understanding of the key features summarized above may be had by reference to the appended drawings, which illustrate the methods and systems of the disclosure. The drawings depict preferred embodiments and, therefore, are not to be considered as limiting its scope with regard to other embodiments which the disclosure is capable of contemplating. Accordingly.

DETAILED DESCRIPTION

Figure 1:
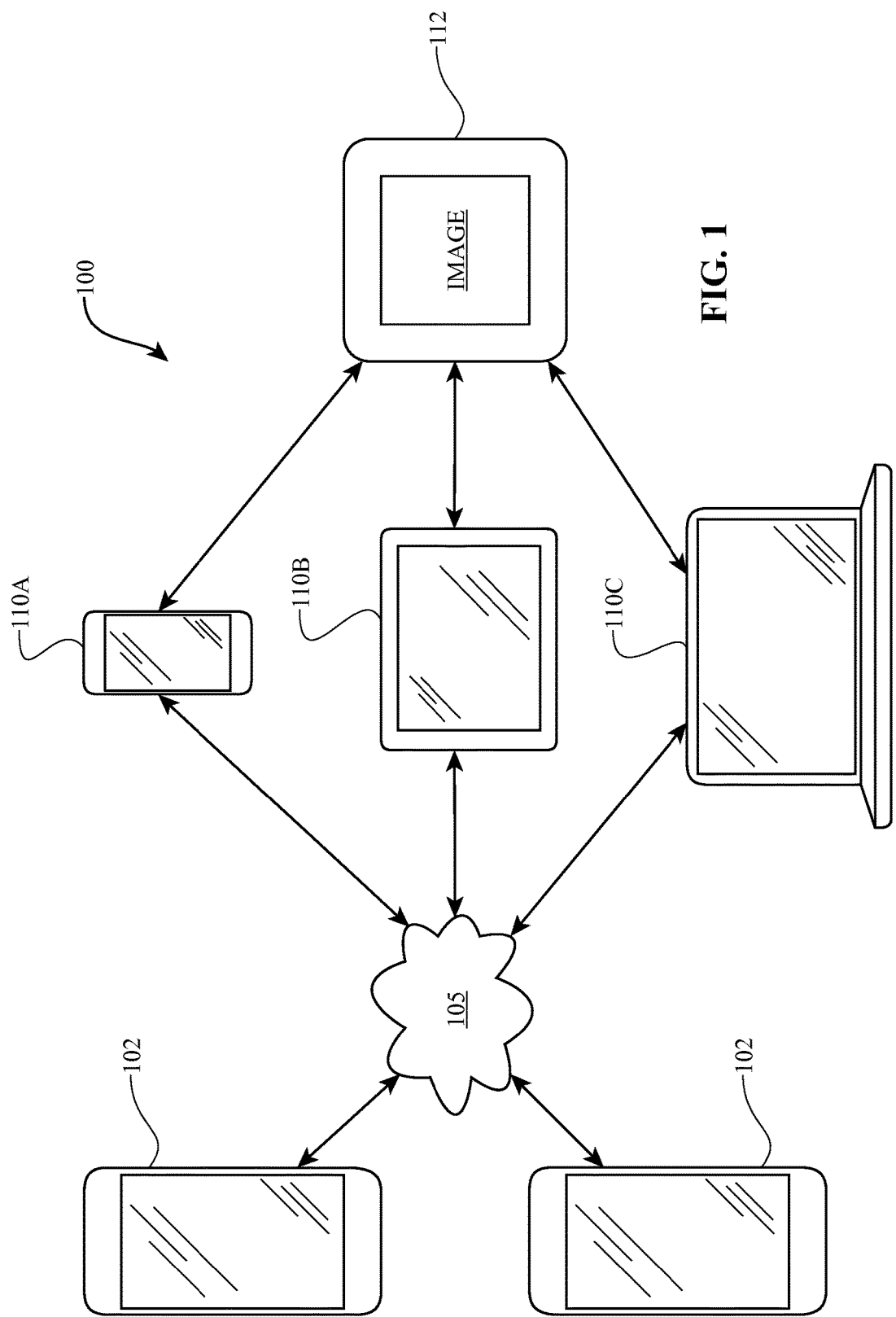
FIG. 1 is a high level diagram of a system 100 for using affordances to manage images and other visual content.
Figure 2A:
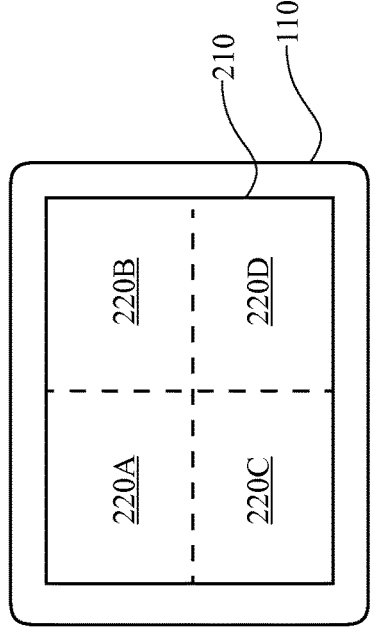
FIGS. 2A-2D depict images presented on touch screen devices having 2, 4, 5 and 9 affordances.
Figure 2B:
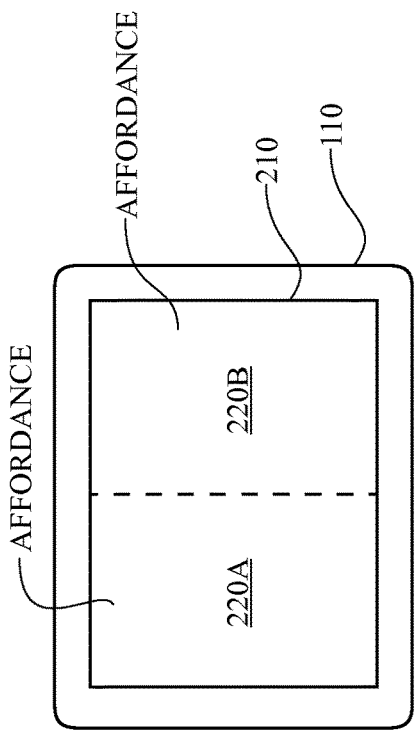
Figure 2C:
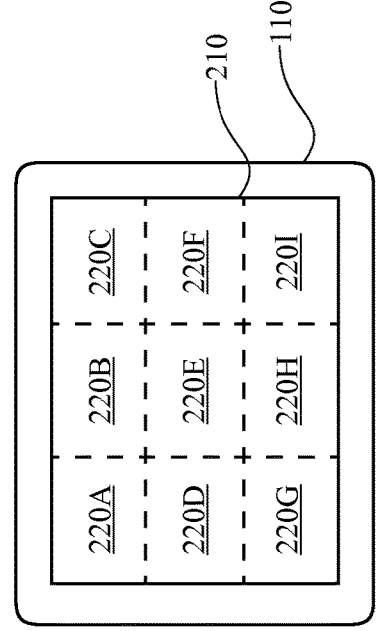
Figure 2D:
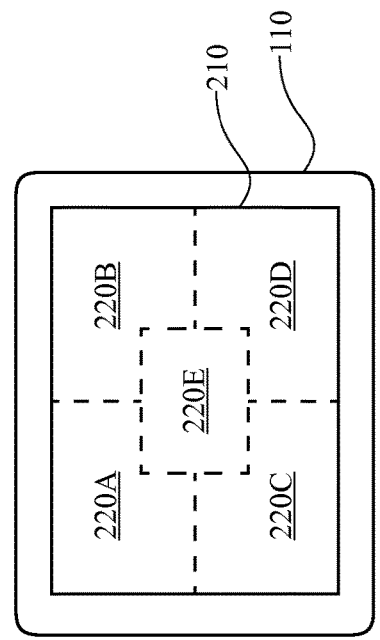

Videos, images, GIFs, animations, multimedia files and other visual content may be retrieved from a source and presented as a single piece of visual content, a group or set of visual content (e.g. a folder, an album, a sheet of thumbnails, etc.), or as a continual presentation of visual content (e.g. a stream). As the visual content is retrieved, the visual content may be presented to a user via a graphical user interface (also referred to as a "GUI"). As the user reviews the visual content, the user may determine one or more actions to take. As used herein, the terms "video", "image", "visual content", "multimedia" and the like may generally refer to content which may be viewed by a user of a GUI. It should be noted that any visual content can have an associated sound file.

Some actions may affect only the visual content presented. For example, the user may want to store the visual content being presented, may want to discard the visual content, may want to share the visual content with others by posting the visual content to a wall, may want to tweet the visual content to followers, may want to share the visual content via a social network, may want to share the visual content using e-mail or some other point-to-point system, or otherwise communicate the visual content to others.

A user input may be a swipe, a drag, a tap, a double tap, a triple tap, a pinch, a zoom, or some other contact with the screen. The contact may be associated with one of at least two affordances associated with the visual content. As a simplified example, assuming a visual content has only two affordances, contact in the first affordance may indicate the visual content should be stored, while contact in the second affordance may indicate the visual content is to be discarded. Those skilled in the art will appreciate that as the number of affordances increases and the number of inputs recognized by the computer increases, the possibilities for how many actions a user can invoke will also increase. Examples of other actions include, but are not limited to, sending visual content, printing visual content, grouping visual content with similar visual content, identifying genres, identifying favorites, sharing visual content and rating visual content.

Embodiments may allow the user to invoke an action based on a user input in relation to an affordance associated with visual content. These actions may affect future visual content as well. For example, a user might not want to see any visual content of a certain subject, having a selected content, in a selected format, etc. In these situations, the user may want to invoke a change in how the system determines what visual content to present. As a simplified example, assuming two affordances, contact in the first affordance may indicate that the user wants to see more visual content like this, while contact in the second affordance may indicate that the user does not like to see these types of visual content. Those skilled in the art will appreciate that as the number of affordances increases and the number of inputs recognized by the computer increases, the possibilities for how many changes a user can invoke will also increase. Examples of changes include, but are not limited to, increasing the amount or type of visual content having the same or similar content, preventing similar visual content from being displayed, automatically storing or categorizing visual content, and the like.

A system for managing affordances may include a computer having a graphical user interface (GUI) having touch screen capabilities (also commonly referred to as a "touch-screen device," a "touch screen device," or simply a "touch-screen" or "touch screen"). Touchscreen capabilities may vary among manufacturers, models and so forth. Touchscreen devices generally have more than one affordance, and many have several affordances.

A processor may detect a user input via the touch screen. The processor may detect a user input based on contact with one or more affordances. For example, a "tap" may refer to the situation in which a user contacts a single affordance (with a single finger) one time and removes the finger from the touch screen. A "pinch" might refer to the situation in which the user contacts two affordances (using two fingers) and moves the fingers toward each other while maintaining contact with the touch screen. Analysis of the user input in conjunction with where on the visual content the user input occurred may be used to determine whether an action needs to occur with the visual content being presented, whether a change to the display process needs to be invoked, or both.

If the system determines that the user input and where it occurred should invoke a change to the display process, an analysis may be performed to determine what change is to be invoked. Embodiments may compare information about the visual content being acted upon with information about other visual content being stored in memory to determine what changes are possible. For example, suppose an image of a soccer player is presented to a user and the user double taps on the bottom left corner of the image. The double tap may be an indicator that the image is to be discarded, but the fact that the double tap occurred in the lower left corner affordance of the image may additionally trigger the system to not show similar or related images. Embodiments may compare information associated with the image (the visual content) to information associated with other visual content and determine that the image is the only image of an amateur soccer player, and that all the other images stored in memory are images of professional soccer players. As another example, tapping on an upper right affordance may cause the system to store the content and double tapping on the upper right affordance may cause the system to store the information and to search for similar content. The system may then search for other images or content related to that soccer player, to an associated team, to an associated league, to others who play the same position, etc. Determination of information about an image may be based on hashtags, labels or other text information (including what language the text information is in) about the image, may be based on the source of the information, may be based on the time or date (including what season), a geographic location associated with the source, etc. From then on, embodiments may receive images of soccer players, and if the system determines the image is of an amateur soccer player, discard it or otherwise not present it via the GUI. However, any images of professional soccer players that are received will be presented. Embodiments may determine that images are not to be presented, but GIFs and videos are to be presented, videos longer than 3 minutes are not to be presented, etc. As the user interacts with more content, the system may refine the rules for what content gets presented or stored, as well as what content does not get presented or does not get stored.

Information used to determine what changes to effect may include basic information about the visual content, metadata about the visual content, comments or other user-added information about the visual content, and the like. For example, images about an invasion may have information such as the author/photographer, a date (e.g., Jun. 6, 1944), a location (e.g., Europe; France; Normandy; Juno Beach, etc.), a person or people (e.g., Eisenhower, Allies, etc.), phrases (e.g., "lest we forget", "the greatest generation"), etc. Similarly, images about a person may include information such as an author/photographer, a birthdate (e.g., Dec. 12, 1915), a name, nickname or physical trait (e.g., "Ol Blue Eyes"), a profession (e.g., singer, actor, crooner), associations (e.g., "the Rat Pack"), and the like. Those skilled in the art will appreciate that if enough information is collected about all the visual content received by a computer and acted upon by a user, embodiments may be able to reliably determine what characteristic or information about visual content is cause to act upon. Furthermore, information associated with a first piece of visual content may be compared with information associated with a second piece of visual content to determine additional criteria for other visual content. For example, continuing the scenario above, a first piece of visual content may have "Ol Blue Eyes" as associated information, and a second piece of visual content may have "Ol Blue Eyes" and "Frank Sinatra" as associated information. Embodiments may include the information "Frank Sinatra" to the previously stored information.

Information may be stored in memory. Information may be stored in a database in memory found on the computer, a data store in a server, a NoSQL (or NOSQL) database, a file, or some other memory using known protocols. A touchscreen device may have access to the memory and access that memory as needed. Thus, control over what a person sees on his/her computer may be based on his/her preferences.

In some embodiments, information stored in the memory may be further analyzed to allow specific advertisements or offers to be presented to a user. For example, if user actions have resulted in an increase in images of warm, sunny climates and few, if any, winter scenes, embodiments may ensure that any ads for vacation packages presented to the user are predominantly warm, sunny climates.

FIG. 1 is a high level diagram of a system 100 for using affordances to manage images and other visual content. A device 110, such as a smart phone 110A, a tablet 110B, a laptop 110C, etc., communicates via network 105 to obtain visual content from one or more servers 102. Servers 102 may be owned by third parties. For example, Twitter, Instagram and Facebook may be associated with servers 102 that can contain images, videos, GIFs, animations and other visual content. The visual content may be uploaded by professionals and amateurs from locations around the world, and may cover any topic or subject. Furthermore, each instance or object of visual content may have metadata, tags, and other associated information. Once an instance of visual content is obtained by device 110, the visual content may be presented using GUI 115 to a user. Presenting the visual content includes associating two or more affordances with the visual content. Once the user touches an affordance, computer instructions stored in device 110 may process the visual content or invoke a change to the process for processing visual content. Processing visual content may include preset conditions (e.g., delete, block, store, search) or may be based according to user preferences (e.g., only photographs, no GIFs, etc.).

FIGS. 2A-2D depict images presented on touch screen devices having 2, 4, 5 and 9 affordances. The size and position of affordances may be based on one or more user preferences, one or more characteristics of device 110, or some combination.

Figure 3:
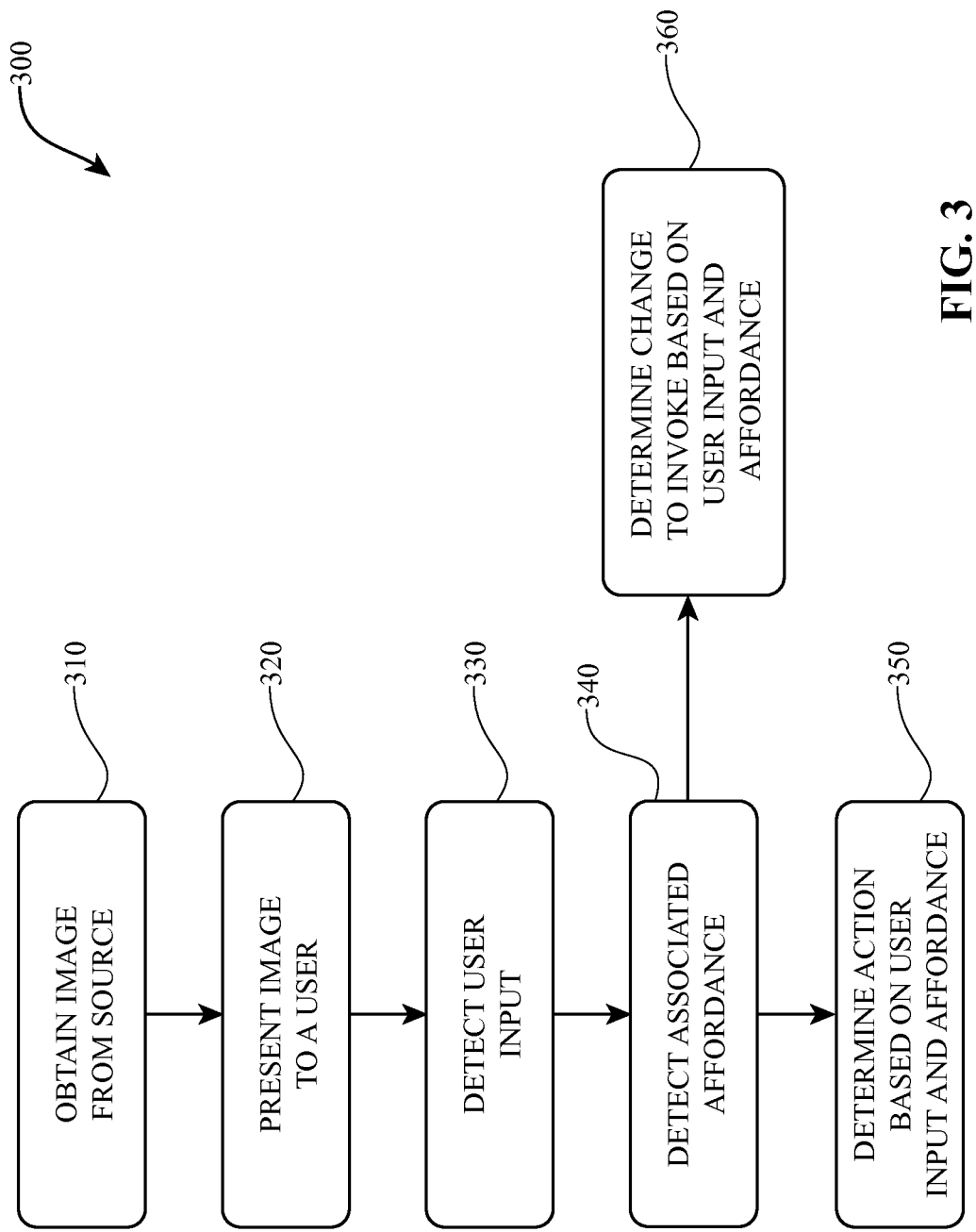
FIG. 3 is a flow diagram, illustrating one method for providing a user with a way to manage visual content using affordances.

FIG. 3 is a flow diagram, illustrating one method 300 for providing a user with a way to manage visual content using affordances.

In step 310, an instance of visual content is obtained from a source. This may involve device 110 communicating with servers 102 via network 105. Obtaining visual content may be the result of a user of device 110 joining a website, enrolling in an application, or otherwise providing a first set of user criteria. The user may provide information such as an address, gender, or other information pertaining to the user, or may provide information associated with interests or likes. For example, a user may provide information about a sports team, an actor or a film genre, a country or region, a breed of animal, a style of architecture, etc.

In step 320, the visual content is presented to a user via GUI 115. Visual content may be presented one instance or object at a time, in groups, or as a continual presentation of visual content such as a stream.

In step 330, device 110 detects a user input. Device 110 may detect tapping, swiping, dragging, pinching, zooming, or other user inputs in any one or more of a plurality of affordances.

In step 340, device 110 detects or determines one or more affordances associated with the user input. It should be noted that a user may contact two affordances at the same time or contact a first affordance and then maintain contact with the touchscreen while moving onto a second affordance.

In step 350, device 110 analyzes the user input and the affordance or affordances to determine what to do with the visual content being presented. The number of affordances contacted, the length of time in contact with an affordance, the order in which two or more affordances are contacted, the direction or speed of any movement across one or more affordances, and other parameters may be analyzed.

In step 360, device 110 analyzes the user input in relation to the affordance to determine a change to invoke on future instances of visual content. The user input may be determined to be a tap, double tap, triple tap, swipe, drag, pinch, zoom, or some other interaction with the touchscreen. A table or other data structure stored in memory may store a set of rules corresponding to what steps or processes are to be done for all contacts with the various affordances. A change to invoke on future instances may include retrieving more instances similar to the visual content that was presented or retrieving fewer instances of the visual content (including presenting no more instances). Retrieving more instances may involve the system finding additional sources of visual content, removing sources of visual content, retrieving visual content from only certain types of visual content providers (e.g., professional photographers vs. amateur photographers, designated content providers vs. blogs, etc.), retrieving content based on criteria such as time (e.g., visual content corresponding to a certain date, day, time, era, etc.), retrieving visual content according to a specified format or style (e.g., .jpegs, .mp4 files, black and white images, having sound, etc.), or the like. Thus, a first user seeing an image of a soccer player may interact with embodiments such that they see more images of the soccer player as a person (including soccer matches but also including other non-soccer events), while another person seeing the same image of the soccer player may interact with embodiments such that they see videos of that soccer player and other soccer players playing soccer.

Those skilled in the art will appreciate that both steps 350 and 360 may be performed for the same instance or object of visual content.

Visual content may be stored on a device or at a server communicatively coupled to the device. For example, a user may interact with a touchscreen device such that visual content is stored on the device, or may interact such that visual content is stored on a server and a pointer is stored on the device to enable the user to view the content at a later time.

Certain specific details are set forth in order to provide a thorough understanding of various embodiments of the disclosure. However, upon reviewing this disclosure, one skilled in the art will understand that the disclosure may be practiced without many of these details. In other instances, some well-known structures and methods associated with the Internet, online social networks, computers, and network systems have not been described in detail to avoid unnecessarily obscuring the descriptions of the embodiments of the disclosure.

The foregoing description detail certain embodiments of the invention and are intended to provide non-limiting examples illustrating features and advantages of the inventive concepts.

The invention claimed is:

1. A system comprising a processor communicatively coupled to a touch screen interface having a plurality of natural affordances comprising a left half and a right half, a top half and a bottom half, or a top left corner, a top right corner, a bottom left corner, a bottom right corner, and a middle, the plurality of natural affordances being associated with the touch screen interface, and a computer readable memory storing a first set of instructions executable by the processor to perform:

receiving, from a user, one or more criteria related to visual content;

retrieving, from an online visual content sharing source, a plurality of instances of visual content based on the one or more criteria;

presenting, via the touch screen interface, an instance of visual content from the plurality of instances of visual content;

detecting a user contact with the touch screen interface in relation to one natural affordance of the plurality of natural affordances; and for user contact with a first natural affordance of the plurality of natural affordances, performing one of displaying, deleting or storing the instance of visual content based on the user contact in relation to the first natural affordance and the one or more criteria related to the instance of visual content, wherein for user contact in the first natural affordance, processing for that instance of visual content is performed according to a first set of instructions relating to that instance of visual content, wherein for user contact with a second natural affordance of the plurality of natural affordances, changing the operation of the system to execute a second set of instructions based on analysis of the user contact in relation to the second natural affordance, wherein the second set of instructions relate to one or more of displaying, deleting or storing of future instances of visual content based on the one or more criteria.

2. The system of claim 1, wherein a criterion of the one or more criteria is user-defined.

3. The system of claim 1, further comprising a database operably coupled to the processor, wherein storing an instance of visual content based on the user contact and the first natural affordance comprises the processor storing that instance of visual content in the database.

4. The system of claim 1, wherein performing one or more of displaying, deleting or storing the instance of visual content comprises the processor preventing storage or presentation of the instance of visual content based on the user contact, the natural affordance in which the user contact occurred, and the second set of instructions.

5. The system of claim 1, wherein performing one or more of displaying, deleting or storing the instance of visual content comprises the processor storing that instance of visual content in memory based on the user contact, the natural affordance in which the user contact occurred, and the second set of instructions.

6. The system of claim 1, wherein performing one or more of displaying, deleting or storing the instance of visual content comprises the processor storing that instance of visual content in a database based on the user contact, the natural affordance in which the user contact occurred, and the second set of instructions.

7. A system comprising a processor operably coupled to a touch screen interface having a plurality of natural affordances comprising a left half and a right half, a top half and a bottom half, or a top left corner, a top right corner, a bottom left corner, a bottom right corner, and a middle, the plurality of natural affordances being associated with the touch screen interface, and a computer readable memory storing a set of instructions executable by the processor to perform:

receiving, from a user, one or more criteria related to visual content;

retrieving, from an online visual content sharing source, a plurality of instances of visual content based on the one or more criteria;

presenting, via the touch screen interface, an instance of visual content from the plurality of instances of visual content;

detecting a user contact with the touch screen interface in relation to one natural affordance of at least two natural affordances associated with the instance of visual content, wherein the at least two natural affordances are based on the touch screen interface; and invoking a change in behavior of the system based on analysis of the user contact in relation to the natural affordance in which the user contact occurred, wherein the change in behavior comprises executing a second set of instructions to perform one or more of displaying, deleting or storing of other instances of visual content based on the one or more criteria.

8. The system of claim 7, wherein a natural affordance comprises a top left corner, a top right corner, a bottom left corner, a bottom right corner, a top edge, a bottom edge, a side edge, or a middle of the touch screen interface.

9. The system of claim 7, wherein performing one or more of displaying, deleting or storing of other instances of visual content based on the one or more criteria comprises the processor preventing storage or presentation of other instances of visual content.

10. The system of claim 7, wherein performing one or more of displaying, deleting or storing of other instances of visual content based on the one or more criteria comprises the processor storing other instances of visual content in memory.

11. The system of claim 7, wherein performing one or more of displaying, deleting or storing of other instances of visual content based on the one or more criteria comprises the processor storing other instances of visual content in a database.

12. The system of claim 7, wherein the change in behavior comprises presenting one or more ads to the user.

13. The system of claim 7, wherein a criterion of the one or more criteria is user-defined.

14. The system of claim 7, wherein performing one or more of displaying, deleting or storing of other instances of visual content based on the one or more criteria comprises:

parsing all data associated with the instance of visual data; and storing the parsed data in a database.

15. The system of claim 14, wherein invoking the change in behavior comprises comparing the parsed data with data stored in a database.

* * * * *